United States Patent [19]

Kopetzky

[11] Patent Number: 4,492,821
[45] Date of Patent: Jan. 8, 1985

[54] SUBSCRIBER CONNECTION CIRCUIT

[75] Inventor: Horst Kopetzky, Unterhaching, Fed. Rep. of Germany

[73] Assignee: Siemens Aktiengesellschaft, Berlin & Munich, Fed. Rep. of Germany

[21] Appl. No.: 404,710

[22] Filed: Aug. 3, 1982

[30] Foreign Application Priority Data

Aug. 27, 1981 [DE] Fed. Rep. of Germany ....... 3133934

[51] Int. Cl.³ .......................... H04M 3/06; H04M 3/22
[52] U.S. Cl. ........................... 179/18 FA; 179/18 HB
[58] Field of Search ........ 179/18 FA, 18 HB, 18 AH, 179/84 R, 84 A

[56] References Cited

U.S. PATENT DOCUMENTS 4,099,032 7/1978 Roge et al. ..................... 179/18 FA
4,297,531 10/1981 Dalhof et al. ................. 179/16 AA Primary Examiner—Thomas W. Brown
Attorney, Agent, or Firm—Hill, Van Santen, Steadman & Simpson

[57] ABSTRACT

In the monitoring of various loop states of subscriber connection lines, a decentralized individual subscriber analysis device is employed which is connected to the subscriber connection line via a voltage divider whose divider ratio is modified accordingly, for which purpose feed resistors of different values are used. For establishing loop closure as a result of a call, during the ringing phase the feed-in points for feed current and ringing alternating current are selected to be such that the ringing alternating voltage components at the inputs of the analysis device compensate one another and therefore do not influence the result of analysis.

10 Claims, 1 Drawing Figure

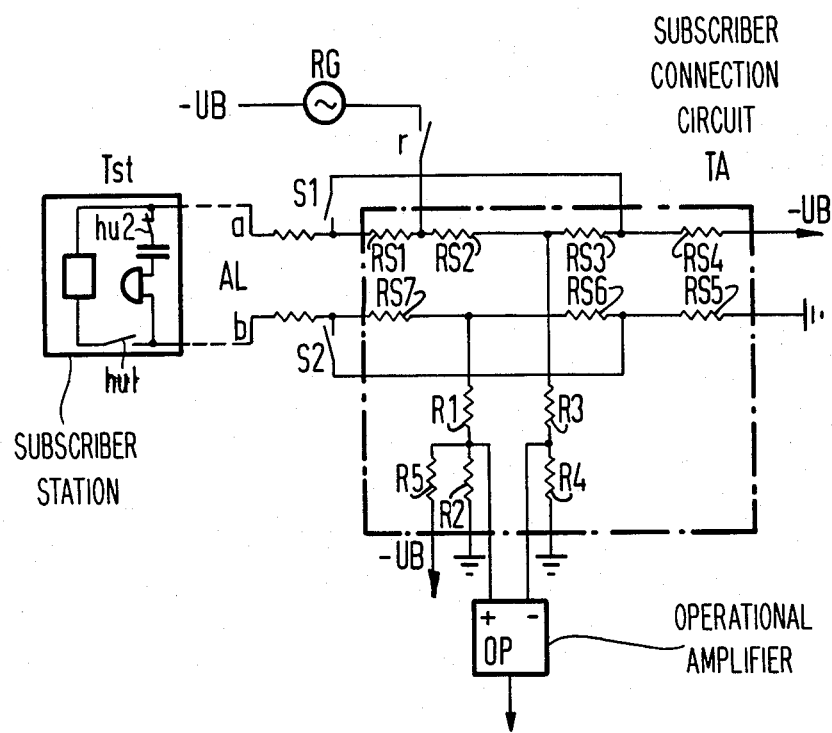

SUBSCRIBER CONNECTION CIRCUIT

BACKGROUND OF THE INVENTION

1. Field of the Invention

The present invention relates to a subscriber connection circuit.

2. Description of the Prior Art

In known telephone systems, the operating states of the subscriber line loop, which are to be monitored, are determined by a central analysis device which controls a plurality of subscriber connection lines. Depending upon the type of operating state monitoring which is to be effected, this analysis device is connected via a special resistance managing network to the subscriber connection line in question which is to be monitored, and, in addition, the subscriber connection line is fed via special feed resistances which are matched to the monitoring function in question. Although this is a favorable solution from the standpoint of circuitry expense, both as the result of the operation of a multiplexer which serves to assign the analysis device to the individual subscriber connection lines and in the event of transfer from one mode of indication to another, fault pulses can occur which reduce the reliability of the analysis.

Therefore, it has been proposed in the German patent application No. P 30 36 686.0 to provide individual subscriber analysis devices.

In order to limit the extra expense which results from this decentralization, measures are provided which permit one and the same analysis device to be used for more than one type of monitoring function. These measures consist in the provision of a plurality of feed resistors which, depending upon the type of monitoring function to be effected, are connected to be included into the feeding circuit or else to be a part of voltage dividers by way of which the multiply exploited analysis device in question is connected to the subscriber connection line. In this manner, in the proposed subscriber connection circuit, by selecting between low-ohmic feed and high-ohmic feed and a corresponding voltage divider ratio of voltage dividers by which a multiply-exploited analysis device is connected to the subscriber connection line, it is possible to use this analysis device both to monitor the excitation state and the subscriber loop interruptions as a result of selection and clearance.

The above-mentioned German patent application contains a special analysis device for monitoring the loop closure as the result of a call, in particular because of the unreliability of analysis caused by ringing alternating currents which are superposed upon the feed current. This analysis device is connected via two voltage dividers possessing the same divider ratio to the V-wire of the subscriber connection line, one of which voltage dividers contains a capacitor which is arranged in series with its other voltage divider resistors. As soon as the subscriber line loop has opened in the ring phase and therefore only the ringing alternating currents flow on the subscriber line, the inverting and non-inverting inputs of a comparator which forms the analysis device is fed with alternating voltages of the same amplitude which therefore compensate one another so that, in this case, the ringing alternating voltage has no effect upon the analysis device. If, in the event of a loop closure the feed current is superposed upon the ringing alternating current, the potentials at the inputs of the comparator of the analysis device assume different values since the direct current component of the current on the subscriber connection line can have no influence upon the first input because of the aforementioned capacitor.

However, the RC element which precedes the first input of the comparator produces a certain response delay of the analysis device which is undesirable since, in the case of a call, loop closure must be indicated particularly rapidly in order to prevent the sum current consisting of feed current and ringing current which then flows across the microphone of the subscriber station from leading to damage.

If a ground closure of the B-wire occurs as a result of a fault, in this proposed subscriber connection circuit a loop closure can no longer be recognized by the analysis device connected to this line wire which increases the danger that the microphone may be damaged by an excess current during the ringing phase as a result of the increased feed current.

SUMMARY OF THE INVENTION

It is therefore the object of the present invention to provide a subscriber connection circuit which, on the one hand, in the same manner as the aforementioned proposed subscriber connection circuit is more favorable in terms of analysis reliability than subscriber connection circuits comprising central analysis devices, but which, on the other hand, is more favorable than the proposed subscriber connection circuit as regards the above-described points.

The above object is realized, according to the present invention, in that for monitoring of the excitation state of the subscriber loop interruptions as a result of dialing and clearance, and for the monitoring of loop closure as a result of a call, a subscriber connection circuit of this kind comprises a single individual subscriber analysis device which is connected via two voltage dividers to the two wires of the subscriber connection line, that it comprises a plurality of feed resistors which serve to supply the feed current to the subscriber connection line, which resistors, depending upon the type of monitoring function to be effected, are either all operated as resistors or else, in part, serve only as a part of the voltage dividers, either at the feed-in point for the subscriber feed current and the ringing alternating current superposed thereupon during the ringing phase, and likewise the voltage divider conditions which prevail during the monitoring of the loop closure as a result of a call, are selected to be such that when the subscriber line loop is open the ringing alternating voltage components which reach the inputs of the analysis device compensate one another.

In the subscriber connection circuit constructed in accordance with the invention, a rapid response of the analysis device is assured even during the monitoring of the subscriber loop closure as a result of a call, as here the aforementioned RC element is avoided and, in addition, the analysis device supplies a loop closure indication even when grounding occurs in the A-wire of the subscriber connection line.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic circuit diagram of a subscriber connection circuit constructed in accordance with the present invention.

DESCRIPTION OF THE PREFERRED EMBODIMENTS

Referring to the drawing, a subscriber station Tst which is connected via a pair of wires a, b of a subscriber connection line to the assigned subscriber connection circuit TA is illustrated.

Among the contents of the subscriber connection circuit are a feed battery which supplies the feed voltage —UB, and a plurality of feed resistors RS1–RS7 by way of which the feed voltage is connected to the subscriber connection line AL. The feed resistors RS1–RS3 and RS6–RS7 can each be bridged by the actuation of a pair of switches S1 and S2. When the switches S1 and S2 are closed, only the resistors RS4 and RS5 are actuated as feed resistors, i.e. a transfer can be effected between high-ohmic and low-ohmic feed.

By way of an analysis device, the illustrated subscriber connection circuit contains a comparator in the form of an operational amplifier OP. The non-inverting input (+) of the operational amplifier OP is connected to the connection point of a pair of resistors R1 and R2 which are connected between the resistors RS7 and RS6, on the one hand, and ground, on the other hand, the resistors R1 and R2 forming a voltage divider by way of which a connection to the battery feed of the b-wire is established. By way of a further resistor R5, which is connected to the feed battery potential —UB, the non-inverting input is appropriately biased in relation to a corresponding response threshold of the operational amplifier OP. The inverting input (—) of the operational amplifier OP is connected to a junction between a pair of resistors R3 and R4 which form a voltage divider located between a reference potential, here ground, and a connection point between the resistors RS2 and RS3 which are part of a connection between the feed battery and the a-wire of the subscriber connection line.

If the subscriber connection line AL is to be monitored with respect to the excitation state, the switches S1 and S2 are open, which means that all the feed resistors RS1 to RS7 are effective as resistances. Because of the aforementioned biasing of the operational amplifier OP and a corresponding voltage divider ratio which then prevails, in this case the operational amplifier OP changes its switching state when the subscriber line loop is closed in the subscriber station Tst as a result of the lifting of the handset of the subscriber station, i.e. closure of the one contact hu1 and opening of the other contact hu2. This transition from one switching state into another is then employed, in a manner which will not be discussed in detail, as an incentive to processes which serve for the establishment of the connection.

If, on the other hand, the subscriber line loop is to be monitored in respect of loop interruptions caused by dialing and clearance, the switches S1 and S2 must be closed so that only the feed resistors RS4 and RS5 are connected as feed resistors. The resistors RS7, RS1 and RS2 which are not used as feed resistors now form portions of voltage dividers to which the resistors R1, R2, R5 and R3 and R4 otherwise also belong. The voltage dividers from which the input voltages for the operational amplifier OP are tapped thus now possess a different divider ratio to the above-mentioned operating situation and, therefore, as desired, in the event of loop interruptions the operational amplifier passes from one switching state into another, which again is used as a monitoring criterion.

During the ringing phase of a subscriber call, the switch r is closed so that the ringing alternating voltage which is supplied by a ringing generator RG and which is superposed with the feed voltage —UB is fed in at the connection point of the resistors RS1 and RS2. The switch S1 is actuated alternatively to the contact r and therefore is open while the contact r is closed, whereas the switch S2 remains closed during the entire ringing time.

For such time as the subscriber line loop is not yet closed during the feed-in of the call, part of the a.c. component of the current fed in at the connection point of the resistors RS1 and RS2 is discharged via the resistors RS2, R3 and R4 and thus influences the inverting input (—) of the operational amplifier OP, but, on the other hand, it flows via the resistor RS1, to the a-wire of the subscriber connection line, the a.c. path of the subscriber station Tst composed of the ringer capacitor C and the ringer W, and via the b-wire and the resistors RS7, R1 and R2. The voltage divider ratio of the voltage divider which governs the inverting input (—) of the operational amplifier OP now differs with respect to that which applied to the above-described operating situations and is selected to be such that the two components of the ringing alternating current influence the inputs of the operational amplifier OP to precisely the same extent and, therefore, compensate one another. This ensures that when the subscriber loop is open the ringing alternating voltage is unable to lead erroneously to an indication of loop closure.

If, during the ringing phase of a call, thus while the contact r is closed, the handset is lifted and therefore the subscriber loop is closed, a direct current path occurs across the subscriber station resulting in a correspondingly-modified voltage drop across the voltage divider which is connected to the non-inverting input (+) of the operational amplifier OP so that the analysis device now responds and therefore indicates a loop closure.

During the ringing pause in the course of a call, thus when the contact r is open and the two switches S1 and S2 are closed, the same current and potential conditions prevail as in the case of the previously-described operating state of the monitoring of the loop interruptions during dialing, with the result that on the transition from the open subscriber loop to the closed subscriber loop a change in state occurs at the output of the analysis device, which likewise leads to a final disconnection of the ringing voltage generator RG.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A subscriber connection circuit for monitoring the state of excitement of subscriber loop interruptions due to dialing and clearance and for monitoring loop closure as a result of a call for a subscriber station which is indirectly connected across a feed battery by first and second conductive paths respectively connected in series with first and second conductors of a subscriber line, said subscriber connection circuit comprising:

an analysis device including first and second inputs and an output and operable to provide a signal at said output which represents the difference and direction of voltages applied to said first and second inputs;

a plurality of resistors connected in series with junctions therebetween in each of said first and second conductive paths, a first of said junctions in said first conductive path serving as a ringing current input;

a first voltage divider connected between a second of said junctions in said first conductive path and said first input of said analysis device;

a second voltage divider connected between a third of said junctions in the second conductive path and said second input of said analysis device; and switching means connected to said plurality of resistors and operable to a first condition in which all of said resistors serve as feed resistors and to a second condition in which some of said resistors serve as feed resistors and others become parts of said first and second voltage dividers and provide ringing voltage components at said first and second inputs of said analysis device in response to ringing current, said resistors, said first, second and third junctions and said first and second voltage dividers selected to provide that the ringing voltage components compensate one another at said first and second inputs of said analysis device when the subscriber loop is open.

2. The subscriber connection circuit of claim 1, wherein:
said first voltage divider comprises a pair of resistors, one of which is connected to ground, with a junction therebetween connected to said first input of said analysis device.

3. The subscriber connection circuit of claim 1, wherein:
said second voltage divider comprises a pair of resistors, one of which is connected to ground, with a junction therebetween connected to said second input of said analysis device, and a further resistor connected in common with said second input and said junction and connected to a potential to provide a bias for said analysis device.

4. The subscriber connection circuit of claim 1, wherein:
said plurality of resistors comprises first, second, third and fourth resistors connected in series in said first conductive path, and fifth, sixth and seventh resistors connected in series in said second conductive path.

5. The subscriber connection circuit of claim 4, wherein:
said switching means comprises a first switch operable to shunt the series connection of said first, second and third resistors, and a second switch operable to shunt the series connection of said sixth and seventh resistors to switch between a high-ohmic feed and a low-ohmic feed.

6. The subscriber connection circuit of claim 1, wherein:
said analysis device comprises a comparator.

7. The subscriber connection circuit of claim 6, wherein:
said comparator comprises an operational amplifier.

8. A subscriber connection circuit for monitoring the state of excitement of subscriber loop interruptions due to dialing and clearance and for monitoring loop closure as the result of a call for a subscriber station which is indirectly connected across a feed battery by first and second conductive paths respectively connected in series with first and second conductors of a subscriber line, said subscriber connection circuit comprising:

an analysis device including first and second inputs and an output and operable to provide a signal at said output which represents the difference and direction of voltages applied to said first and second inputs;

a plurality of resistors connected in series with junctions therebetween in each of the first and second conductive paths, a first of said junctions in said first conductive path serving as a ringing current input, said plurality of resistors comprising first, second, third and fourth resistors connected in series in said first conductive path, and fifth, sixth and seventh resistors connected in series in said second conductive path;

a first voltage divider connected between the second of said junctions in said first conductive path and said first input of said analysis device, said first voltage divider comprising a first pair of voltage divider resistors, one of which is connected to ground, with a junction therebetween connected to said first input of said analysis device;

a second voltage divider connected between a third of said junctions in the second conductive path and said second input of said analysis device, said second voltage divider comprising a second pair of voltage divider resistors, one of which is connected to ground, with a junction therebetween connected to said second input of said analysis device, and a further resistor connected in common with said second input and said junction and connected to a potential to provide a bias for said analysis device; and switching means connected to said plurality of resistors and operable to a first condition in which all of said resistors serve as feed resistors and to a second condition in which some of said resistors serve as feed resistors and others become parts of said first and second voltage dividers and provide ringing voltage components at said first and second inputs of said analysis device in response to ringing current, said switching means comprising a first switch operable to shunt the series connection of said first, second and third resistors, and a second switch operable to shunt the series connection of said sixth and seventh resistors to switch between a high-ohmic feed and a low-ohmic feed, said resistors, said first, second and third junctions and said first and second voltage dividers selected to provide that the ringing voltage components compensate one another at said first and second inputs of said analysis device when the subscriber line loop is open.

9. The subscriber connection circuit of claim 8, wherein:
said analysis device comprises a comparator.

10. The subscriber connection circuit of claim 9, wherein:
said comparator comprises an operational amplifier.

* * * * *